United States Patent
Greenberger et al.

(10) Patent No.: US 9,794,213 B1
(45) Date of Patent: Oct. 17, 2017

(54) SOCIAL INTERACTION DATA PRESERVATION FOR AUGMENTED PHOTOS

(71) Applicant: International Business Machines Corporation, Armonk, NY (US)

(72) Inventors: Jeremy A. Greenberger, Raleigh, NC (US); Trudy L. Hewitt, Cary, NC (US); Jana Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/337,677

(22) Filed: Oct. 28, 2016

(51) Int. Cl.
  *G06F 15/16* (2006.01)
  *H04L 12/58* (2006.01)
  *G06K 9/62* (2006.01)

(52) U.S. Cl.
  CPC .......... *H04L 51/32* (2013.01); *G06K 9/6215* (2013.01)

(58) Field of Classification Search
  CPC ...................................... H04L 51/32
  USPC .................................. 709/203, 206
  See application file for complete search history.

(56) References Cited

U.S. PATENT DOCUMENTS

| 9,116,596 B2* | 8/2015 | Roman ............... G06F 3/0481 |
| 2013/0238724 A1* | 9/2013 | Cunningham ......... H04L 51/24 709/206 |
| 2013/0328932 A1 | 12/2013 | Kim et al. |
| 2014/0129627 A1 | 5/2014 | Baldwin et al. |

* cited by examiner

*Primary Examiner* — Adnan Mirza
(74) *Attorney, Agent, or Firm* — Steven M. Greenberg, Esq.; CRGO Law

(57) ABSTRACT

Embodiments of the present invention provide a method, system and computer program product for social interaction data preservation for augmented photos. In an embodiment of the invention, a method for social interaction data preservation for augmented photos includes selecting for replacement an image posted to a social media site and replacing the selected image in the social media site with a new image. The method also includes determining if the new image is similar to the selected image and preserving a thread of responsive postings for the selected image in the social media site and associating the preserved thread with the new image in the social media site if the new image is determined to be similar to the selected image, but otherwise discarding the thread of responsive postings.

15 Claims, 1 Drawing Sheet

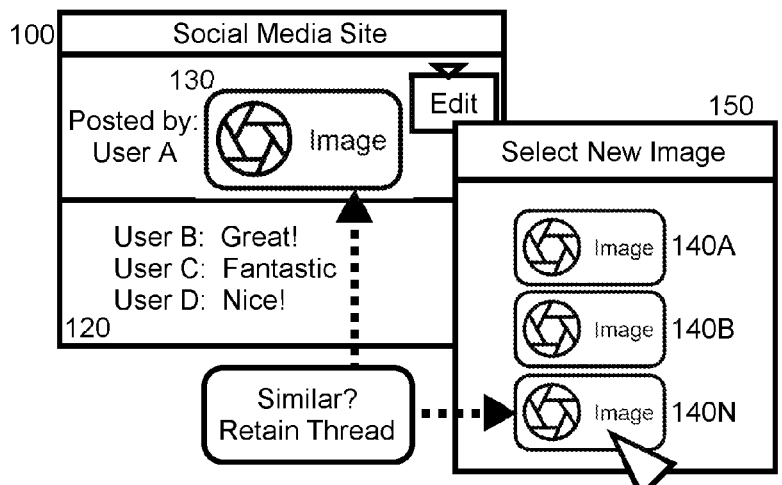
FIG. 1
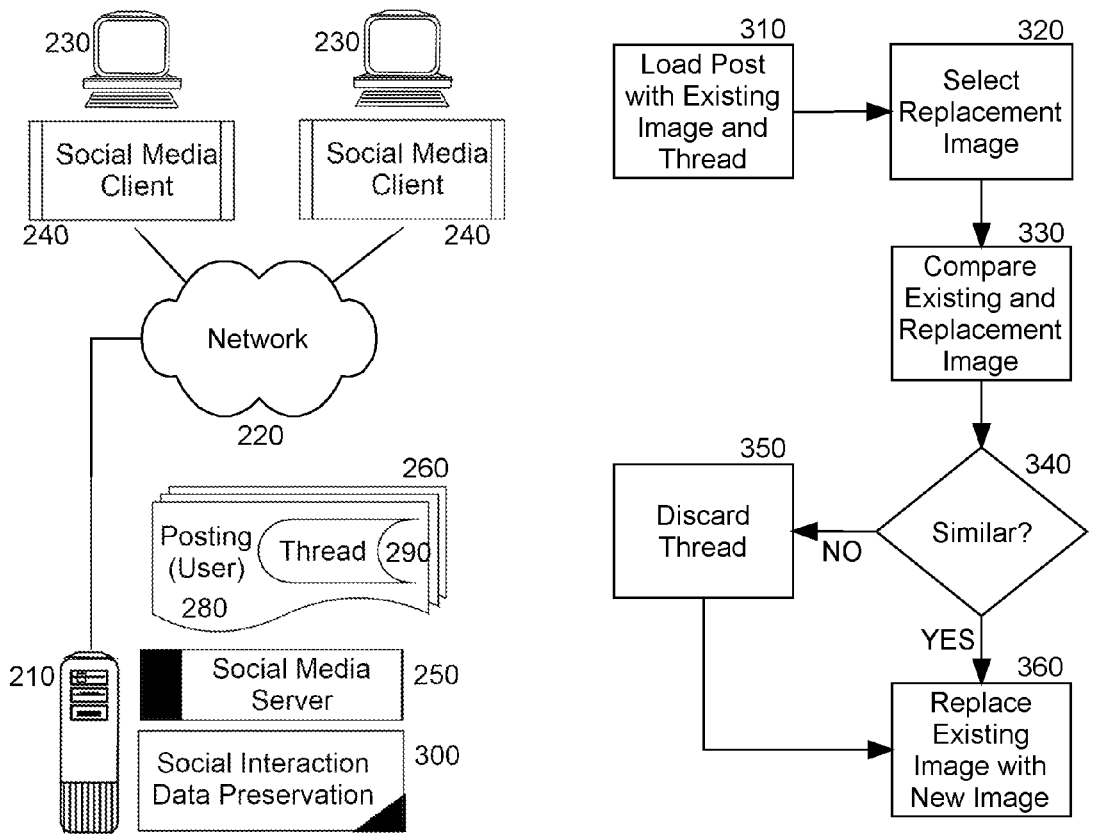
FIG. 2
FIG. 3

SOCIAL INTERACTION DATA PRESERVATION FOR AUGMENTED PHOTOS

BACKGROUND OF THE INVENTION

Field of the Invention

The present invention relates to photo processing in social media and more particularly to social interaction data management for uploaded photos in a social media data processing system.

Description of the Related Art

Even prior to the development of the Internet, social collaborative technologies supported the ability of geographically distant individuals to communicate and exchange information through the use personal computers and advanced workstations. Almost from the first days of personal computing, online information services included e-mail capabilities, instant chat technologies, shared document repositories and bulletin board facilities so that globally distant end users could share documents and ideas. The advent of the Internet only improved the ease in which end users could collaborate despite the great distances separating the end users. But, the development of social media has changed the way in which individuals interact with one another over the Internet.

Originally, the Internet provided for a revolutionary way for geographically distant users to exchange information and documents without requiring all end users to utilize the same accessing client. Instead, end users were free to use any client available so long as the client supported the Internet protocol (IP) and the transport control protocol (TCP). Soon, thereafter, the search engine enabled those same distant users to search for a priori unknown information and then to retrieve the located information for viewing in a corresponding client. The development of social networking technologies, though, provided the ultimate spark causing the massive expansion of the Internet to now include nearly half of the world's population.

Social media generally includes a bundle of technologies that augment the content sharing nature of the internet by providing for the filtering of the content sharing population for each participant according to a corresponding social network. In social media, content once shared by a participant is limited in its distribution to only those recognized by the participant as present in a social network of the participant and then only those members of the social network permitted by the participant to view the shared content. Each participant in social media additionally may either further limit access to shared content to a subset of those in a corresponding social network, or oppositely, augment access to the shared content to individuals outside of the corresponding social network.

Shared content in social media generally includes textual remarks, though in many instances, shared content includes imagery, video, audio or documentation. As well, shared content in social media often is distributed by the participant with the intent to elicit responsive content by others permitted to access the shared content. Responsive content may be as simple as a selected sentiment such as a "like", or as complex as contributed text, imagery, audio, video or documentation. Thus, a thread of social commentary may be attached to different social media content contributions provided by different participants.

In many social media applications, once content has been posted to social media, the responsive thread may then develop as responsive contributions are received by those permitted by the content provider to access the posted content. Even during the course of receiving responsive content, the content provider may edit the textual content so as to modify the original textual content. But, unlike a textual contribution to social media, in terms of the posting of an image, the entirety of a responsive thread will be lost if the image is subsequently removed and replaced by a different image.

BRIEF SUMMARY OF THE INVENTION

Embodiments of the present invention address deficiencies of the art in respect to photo editing in social media and provide a novel and non-obvious method, system and computer program product for social interaction data preservation for augmented photos. In an embodiment of the invention, a method for social interaction data preservation for augmented photos includes selecting for replacement an image posted to a social media site and replacing the selected image in the social media site with a new image. The method also includes determining if the new image is similar to the selected image and preserving a thread of responsive postings for the selected image in the social media site and associating the preserved thread with the new image in the social media site if the new image is determined to be similar to the selected image, but otherwise discarding the thread of responsive postings.

In one aspect of the embodiment, the new image is an edited version of the selected image. For example, the edited version may be a version of the selected image with red-eye correction applied to the selected image. As another example, the edited version may be a version of the selected image with an adjusted brightness or sharpness applied to the selected image. As yet another example, the image is one of several similar images acquired in close temporal proximity of one another. In another aspect of the embodiment, the method additionally includes responding to an initial posting of the selected image to the social media site by searching the social media site for a different image of similar context as the selected image, but with better resolution, and designating the different image as the new image.

In another embodiment of the invention, a social media data processing system is configured for social interaction data preservation for augmented photos. The system includes a host computing system with one or more computers, each with memory and at least one processor. The system also includes a social media site hosted by the host computing system and accessible by different end users over a computer communications network. Finally, the system includes a social interaction data preservation module coupled to the social media site. The module includes program code enabled upon execution in the host computing system to select for replacement an image posted to the social media site, replace the selected image in the social media site with a new image, determine if the new image is similar to the selected image and preserve a thread of responsive postings for the selected image in the social media site and associating the preserved thread with the new image in the social media site if the new image is determined to be similar to the selected image, but otherwise discarding the thread of responsive postings.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for social interaction data preservation for augmented photos;

FIG. 2 is a schematic illustration of a social media data processing system configured for social interaction data preservation for augmented photos; and, FIG. 3 is a flow chart illustrating a process for social interaction data preservation for augmented photos.

DETAILED DESCRIPTION OF THE INVENTION

Embodiments of the invention provide for social interaction data preservation for augmented photos. In accordance with an embodiment of the invention, an existing image previously posted to a social media site by a contributor to the social media site is selected for removal and replacement. In response, a new image is posted to the social media web site in replacement of the existing image previously posted to the social media site. It is then determined if the replacement of the existing image is contextually similar to the existing image. If so, a thread of responsive postings associated with the existing image remains posted in the social media site, but in connection with the new image posted to the social media sit in replacement of the existing image. Otherwise, the thread of responsive postings is discarded.

In further illustration, FIG. 1 pictorially shows a process for social interaction data preservation for augmented photos. As shown in FIG. 1, a social media site 100 accepts a posting by a user that includes an initial image 130. A thread of responsive postings 120 to the initial image 130 are also received and displayed in the social media site 100 in connection with the initial image 130. The user then selects a new image 140N from amongst a selection 150 of images 140A, 140B, 140N to replace the initial image 130. It is then determined if the new image 140N is similar to the initial image 130, for instance if the new image 140N is the same as the initial image 130 but inclusive of editorial corrections to portions of the initial image 130 such as a red-eye correction, or a change in exposure, brightness, sharpness tone, etc., or if the new image 140N is within a threshold degree of similarity of the initial image 130 because the new image 140N and the initial image are part of a sequence of images acquired in temporal proximity of one another such as in a burst mode of photography.

In this regard, image similarity may be determined by the computation of a signature for each of the new image 140N and the initial image 130 and the comparison of the signatures. For instance, one way in which image similarity may be determined includes extracting one or more image features of each of the new image 140N and the initial image 130 and computing a Euclidian distance between the image features with a shorter distance indicating image similarity. Another way in which image similarity may be determined includes computing a probability distribution for each of the new image 140N and the initial image 130 and measuring a Manhattan or Euclidian distance between the probability functions. Alternatively, a catalog of recognized faces and positions of the faces in each of the new image 140N and the initial image 130 may be compared.

If it is determined that the new image 140N is similar to the initial image 130, the initial image 130 is replaced in the social media site 100 with the new image 140N. As well, the thread of responsive postings 120 is retained and displayed in the social media site 100 in connection with the new image 140N. Otherwise, the initial image 130 is replaced in the social media site 100 with the new image 140N. Furthermore, the thread of responsive postings 120 is discarded and no longer displayed in the social media site 100 in connection with the new image 140N.

The process described in connection with FIG. 1 is implemented in a social media data processing system. In further illustration, FIG. 2 schematically illustrates a social media data processing system configured for social interaction data preservation for augmented photos. The system includes a host computing platform 210 including one or more computers, each with memory and at least one processor. The host computing platform 210 is communicatively coupled over computer communications network 220 to different computing clients 230 including one or more personal computers and one or more mobile devices in which respective social media clients 240 execute.

The host computing platform 210 supports the operation of a social media server 250 managing different social media postings 260 by different end users through the social media clients 240. Each of the social media postings 260 includes a posted image 280, and optionally textual commentary referring to the posted image 280. A thread of responsive postings 290 also is included in each of the social media postings 260, the thread of responsive postings 290 providing commentary in connection with a corresponding posted image 280. Finally, a social interaction data preservation module 300 is coupled to the social media server 250.

The social interaction data preservation module 300 includes program code that when executing in the memory of the host computing platform, is enabled to respond to a directive to replace an existing posted image 280 in a social media posting 260 with a different image. The directive may be manually specified by an end user electing to edit the social media posting 260 and then selecting the different image to replace the existing posted image 280. Optionally, the directive may be automated in so far as the social media server 250 may automatically edit the posted image 280 to improve image quality thereby producing a different image, or the social media server 250 may automatically search for and locate a different image that is contextually comparable but of better image quality to the posted image 280.

In either circumstance, the response by the program code of the social interaction data preservation module 300 to a directive to replace the existing posted image 280 in a social media posting 260 with the different image includes comparing the content of the existing posted image 280 and the different image in order to determine if the different image is similar in content to the posted image 280. The determination of similarity may include determining whether the new image is within a threshold degree of similarity of the posted image. The determination of similarity may include detecting in the different image only a red-eye correction in the posted image 280, or detecting in the different image only a change to the brightness or sharpness of the posted image 280. A difference due to red-eye correction or a difference in brightness or sharpness may be within a similarity threshold in some embodiments. As well, the determination of similarity may be performed computationally by the processor of the host computing platform by comparing image signatures for the posted image 280 and the different image, for instance by comparing a set of extracted image features of the posted image 280 with a corresponding set of extracted image features of the different image.

The response by the program code in the event that the different image is determined to be similar to the posted image 280 includes replacing the posted image 280 with the different image, but preserving the corresponding thread 290 in connection with the different image. Otherwise, the response by the program code includes discarding, e.g., deleting from memory, the corresponding thread 290 when replacing the posted image 280 with the different image. In some embodiments, the posted image may be deleted from memory when the posted image is replaced with a different image. Accordingly, various embodiments may permit the social media server to operate with smaller memory requirements.

In even yet further illustration of the operation of the social interaction data preservation module 300, FIG. 3 is a flow chart illustrating a process for social interaction data preservation for augmented photos. Beginning in block 310, the social media server 250 loads a social media posting that includes both an existing image and a thread of responsive postings. In block 320, the social media server 250 selects the existing image for replacement with a new image. In block 330, the social interaction data preservation module 300 compares the new image and the existing image. In decision block 340, the social interaction data preservation module 300 determines if the new image and existing image are similar, for instance if the new image differs from the existing image only by a red-eye correction to the existing image, or if the new image differs from the existing image only by a change to the brightness or sharpness of the existing image. If not, in block 350 the social interaction data preservation module 300 removes the thread of responsive postings from the social media posting. In either case, in block 360 the social media server 250 replaces the existing image in the social media posting with the new image.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A method for social interaction data preservation for augmented photos, the method comprising:
    posting an image to a social media site;
    receiving textual commentary for the posted image from a multiplicity of users of the social media site and displaying the textual commentary of the multiplicity of the users in connection with the posted image as a thread of responsive postings;
    selecting the image for replacement;
    replacing the selected image in the social media site with a new image that is an edited version of the selected image;
    determining whether or not the new image is similar to the selected image; and,
    preserving the thread of responsive postings for the selected image in the social media site and associating the preserved thread with the new image in the social media site based on determining that the new image is similar to the selected image, but otherwise discarding the thread of responsive postings.

2. The method of claim 1, wherein the edited version is a version of the selected image with red-eye correction applied to the selected image.

3. The method of claim 1, wherein the image is one of several similar images acquired in close temporal proximity of one another.

4. The method of claim 1, wherein the edited version is a version of the selected image with an adjusted brightness or sharpness applied to the selected image.

5. The method of claim 1, further comprising responding to an initial posting of the selected image to the social media site by searching the social media site for a different image of similar context as the selected image, but with better resolution, and designating the different image as the new image.

6. A social media data processing system configured for social interaction data preservation for augmented photos, the system comprising:
    a host computing system comprising one or more computers, each with memory and at least one processor;
    a social media site hosted by the host computing system and accessible by different end users over a computer communications network the social media site posting an image and receiving textual commentary for the posted image from a multiplicity of users of the social media site and displaying the textual commentary of the multiplicity of the users in connection with the posted image as a thread of responsive postings; and,
    a social interaction data preservation module coupled to the social media site and comprising program code enabled upon execution in the host computing system to select the image for replacement, replace the selected image in the social media site with a new image that is an edited version of the selected image, determine whether or not the new image is similar to the selected image and preserve the thread of responsive postings for the selected image in the social media site and associating the preserved thread with the new image in the social media site based upon the new image being determined to be similar to the selected image, but otherwise discarding the thread of responsive postings.

7. The system of claim 6, wherein the edited version is a version of the selected image with red-eye correction applied to the selected image.

8. The system of claim 6, wherein the edited version is a version of the selected image with an adjusted brightness or sharpness applied to the selected image.

9. The system of claim 6, wherein the image is one of several similar images acquired in close temporal proximity of one another.

10. The system of claim 6, wherein the program code is further enabled to respond to an initial posting of the selected image to the social media site by searching the social media site for a different image of similar context as the selected image, but with better resolution, and designating the different image as the new image.

11. A computer program product for social interaction data preservation for augmented photos, the computer program product comprising a computer readable storage medium having program instructions embodied therewith, wherein the computer readable storage medium is not a transitory signal per se, the program instructions executable by a device to cause the device to perform a method comprising:

posting an image to a social media site;

receiving textual commentary for the posted image from a multiplicity of users of the social media site and displaying the textual commentary of the multiplicity of the users in connection with the posted image as a thread of responsive postings;

selecting the image for replacement;

replacing the selected image in the social media site with a new image that is an edited version of the selected image;

determining whether or not the new image is similar to the selected image; and, preserving the thread of responsive postings for the selected image in the social media site and associating the preserved thread with the new image in the social media site based upon the new image being determined to be similar to the selected image, but otherwise discarding the thread of responsive postings.

12. The computer program product of claim 11, wherein the edited version is a version of the selected image with red-eye correction applied to the selected image.

13. The computer program product of claim 11, wherein the edited version is a version of the selected image with an adjusted brightness or sharpness applied to the selected image.

14. The computer program product of claim 11, wherein the image is one of several similar images acquired in close temporal proximity of one another.

15. The computer program product of claim 11, wherein the method further comprises responding to an initial posting of the selected image to the social media site by searching the social media site for a different image of similar context as the selected image, but with better resolution, and designating the different image as the new image.

* * * * *